(12) United States Patent
Sakurai et al.

(10) Patent No.: US 9,745,532 B2
(45) Date of Patent: Aug. 29, 2017

(54) POLYUREA CROSSLINKED PARTICLES FOR TRANSPORT DEVICE MEMBER, SLIDING MEMBER AND METHOD OF PREPARING POLYUREA CROSSLINKED PARTICLES FOR TRANSPORT DEVICE MEMBER

(71) Applicants: HONDA MOTOR CO., LTD., Minato-Ku, Tokyo (JP); NEGAMI CHEMICAL INDUSTRIAL CO., LTD., Nomi-Shi, Ishikawa (JP)

(72) Inventors: Tasuku Sakurai, Wako (JP); Keiko Nishita, Nomi (JP)

(73) Assignees: Honda Motor Co., Ltd., Tokyo (JP); Negami Chemical Industrial Co., Ltd., Ishikawa (JP)

( * ) Notice: Subject to any disclaimer, the term of this patent is extended or adjusted under 35 U.S.C. 154(b) by 0 days.

(21) Appl. No.: 15/171,479

(22) Filed: Jun. 2, 2016

(65) Prior Publication Data

US 2016/0362625 A1  Dec. 15, 2016

(30) Foreign Application Priority Data

Jun. 11, 2015  (JP) .................................. 2015-118189

(51) Int. Cl.
*C10M 107/44* (2006.01)
*C08G 18/02* (2006.01)
*C10M 177/00* (2006.01)

(52) U.S. Cl.
CPC ........... *C10M 107/44* (2013.01); *C08G 18/02* (2013.01); *C10M 177/00* (2013.01); *C10M 2217/0453* (2013.01); *C10M 2217/0456* (2013.01); *C10N 2250/12* (2013.01); *C10N 2250/121* (2013.01); *C10N 2250/18* (2013.01); *C10N 2270/00* (2013.01)

(58) Field of Classification Search
CPC ........ C10M 107/44; C10M 2217/0453; C08G 18/02
See application file for complete search history.

(56) References Cited

U.S. PATENT DOCUMENTS

2010/0144564 A1  6/2010  Kamiya et al.

FOREIGN PATENT DOCUMENTS

JP   2001089635 A  *  4/2001
WO  2008/044598 A1    4/2008

* cited by examiner

*Primary Examiner* — Taiwo Oladapo
(74) *Attorney, Agent, or Firm* — Carrier Blackman & Associates, P.C.; Joseph P. Carrier; William D. Blackman

(57) ABSTRACT

Polyurea crosslinked particles for a transport device member are provided that have high acid resistance, increase long-term retainability when included in a coating film, and are capable of maintaining a high sliding property for a long time. The polyurea crosslinked particles for a transport device member are particles formed of reactants of a self-emulsifying isocyanate having two or more isocyanate groups and a non-self-emulsifying isocyanate having two or more isocyanate groups and having a ring structure in the presence of water and a crosslink density thereof is $1 \times 10^{-4}$ mol/g or more.

8 Claims, 7 Drawing Sheets

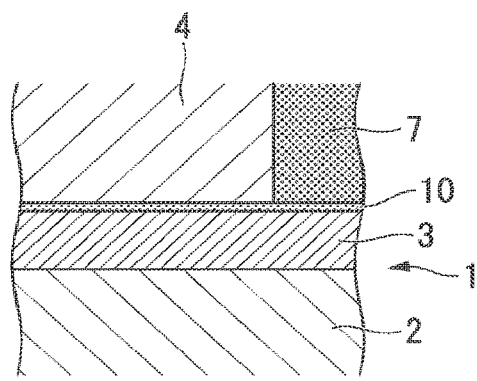
FIG. 1A
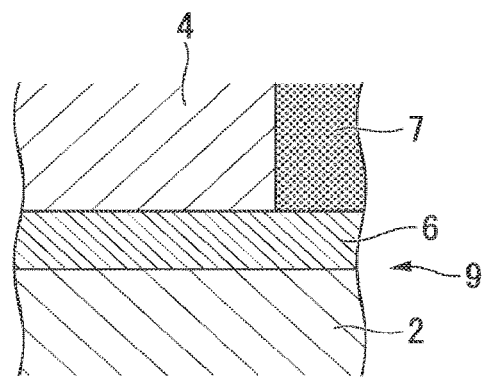
FIG. 1B
RELATED ART
FIG. 2
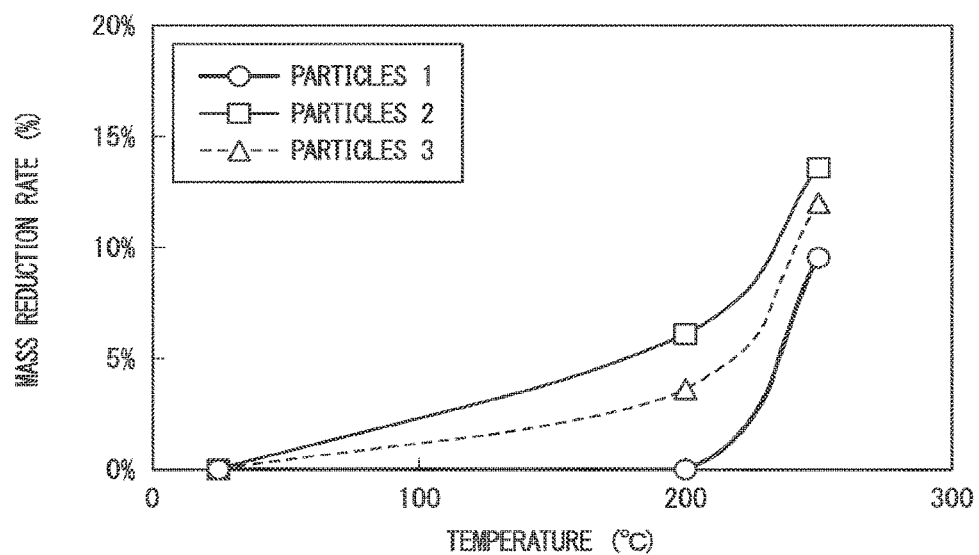

POLYUREA CROSSLINKED PARTICLES FOR TRANSPORT DEVICE MEMBER, SLIDING MEMBER AND METHOD OF PREPARING POLYUREA CROSSLINKED PARTICLES FOR TRANSPORT DEVICE MEMBER

BACKGROUND OF THE INVENTION

Field of the Invention

The present invention relates to polyurea crosslinked particles for a transport device member. In addition, the present invention relates to a sliding member including a lubricant-retaining coating film that retains an oil, for example, to a surface treatment through which an engine sliding portion has low friction. In addition, the present invention relates to a method of preparing polyurea crosslinked particles for a transport device member.

Priority is claimed on Japanese Patent Application No. 2015-118189, filed Jun. 11, 2015, the content of which is incorporated herein by reference.

Description of Related Art

In the related art, in a sliding member such as a piston, a slide bearing, and a gear of an engine of a transport device such as a motor vehicle, a surface treatment for reducing frictional resistance is performed on a sliding surface that slides with respect to other members in the presence of a lubricant in some cases. As the surface treatment, for example, a method of forming a solid lubrication film including a binder resin containing a polyamide-imide resin or the like, a solid lubricant containing molybdenum disulfide or the like is known (PCT International Publication No. WO 2008/044598). In a member in which the solid lubrication film is formed, frictional resistance can be reduced and sliding torque decreases.

SUMMARY OF THE INVENTION

Since the solid lubrication film described in PCT International Publication No. WO 2008/044598 has no oil adsorption property, even when a lubricant is included, an oil film for improving a sliding property is not sufficiently formed on a surface of the solid lubrication film. In addition, even when the oil film is formed, if another member slides on a surface of the solid lubrication film, the oil film is scraped off and is likely to be separated. Therefore, a layer in which stress that acts to slide in a direction parallel on a certain surface of an object is smallest, that is, a lowest shear layer, serves as an interface between the solid lubrication film and another member, and it is difficult to decrease frictional resistance and sliding torque sufficiently and sustainably.

Therefore, in order to increase retainability of the oil film by improving an oil adsorption property, resin particles having a high affinity with an oil are considered to be included in a coating film instead of a solid lubricant.

However, the lubricant gradually degrades with time and the degree of acidity tends to increase. In the lubricant having a high degree of acidity, resin particles included in the coating film are decomposed, oil retainability decreases, and a sliding property of a sliding member decreases. Accordingly, in the related art, a high sliding property is not sustainable. For example, when the sliding member is used for an engine, a torque reduction effect is not sustainable.

The present invention provides polyurea crosslinked particles for a transport device member that have high acid resistance, increase long-term oil retainability when included in a coating film, and are capable of maintaining a high sliding property for a long time. In addition, the present invention provides a sliding member having high oil retainability for a long time and capable of maintaining a high sliding property.

The polyurea crosslinked particles for a transport device member (hereinafter simply referred to as "polyurea crosslinked particles") of the present invention are particles formed of reactants of a self-emulsifying isocyanate having two or more isocyanate groups and a non-self-emulsifying isocyanate having two or more isocyanate groups and having a ring structure in the presence of water and a crosslink density thereof is $1 \times 10^{-4}$ mol/g or more.

In the polyurea crosslinked particles for a transport device member of the present invention, any of the self-emulsifying isocyanate and the non-self-emulsifying isocyanate preferably include three or more isocyanate groups.

In the polyurea crosslinked particles for a transport device member of the present invention, the self-emulsifying isocyanate has a content ratio that is preferably 30 to 90 mass % when a total of the isocyanates is set as 100 mass %.

In the sliding member of the present invention, a lubricant-retaining coating film is formed on a surface of a sliding portion. The lubricant-retaining coating film includes a plurality of polyurea crosslinked particles for a transport device member of the present invention and a binder resin for binding the polyurea crosslinked particles to each other.

In the sliding member of the present invention, the polyurea crosslinked particles in the lubricant-retaining coating film have a content ratio that is preferably 60 mass % or less and more preferably 5 to 30 mass % when the lubricant-retaining coating film is set as 100 mass %.

The method of preparing polyurea crosslinked particles for a transport device member of the present invention comprises reacting a self-emulsifying isocyanate having two or more isocyanate groups and a non-self-emulsifying isocyanate having two or more isocyanate groups and having a ring structure in the presence of water.

The polyurea crosslinked particles for a transport device member of the present invention have high acid resistance, increase long-term oil retainability when included in a coating film, and are capable of maintaining a high sliding property for a long time.

The sliding member of the present invention has high oil retainability for a long time, and is capable of maintaining a high sliding property. In addition, in the sliding member of the present invention, since flash heat generation decreases according to an improvement of a sliding property resulting from oil retention, it is possible to suppress thermal degradation of the binder resin.

BRIEF DESCRIPTION OF THE DRAWINGS

FIG. 1A is a cross-sectional view showing a utilization example of an embodiment of a sliding member of the present invention.

FIG. 1B is a cross-sectional view showing a utilization example of a sliding member in the related art.

FIG. 2 is a graph showing a mass reduction rate when particles 1 to 3 are heated.

DETAILED DESCRIPTION OF THE INVENTION

Figure 3:
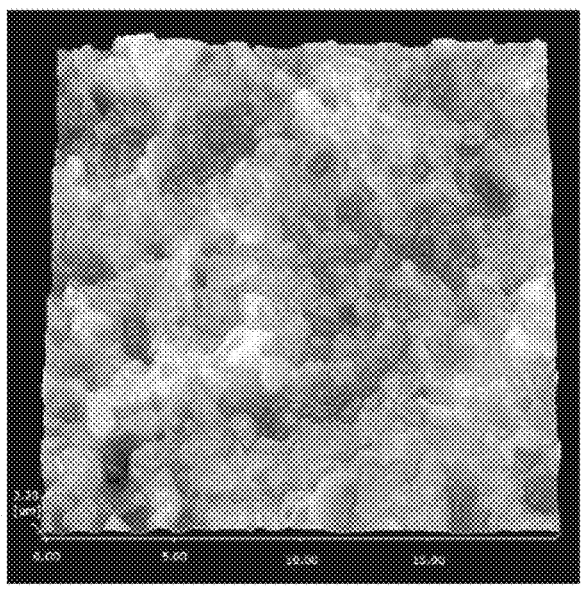
FIG. 3 shows an image of a shape of a surface of a lubricant-retaining coating film of a sliding member of Example 3, which is observed using a scanning probe microscope.

<Polyurea Crosslinked Particles for a Transport Device Member>

Polyurea crosslinked particles for a transport device member of the present invention are particles that are formed of reactants of a self-emulsifying isocyanate having two or more isocyanate groups and a non-self-emulsifying isocyanate having two or more isocyanate groups and having a ring structure in the presence of water. In addition, the polyurea crosslinked particles of the present invention have polyurea on surfaces of the particles and have no urethane structure.

The self-emulsifying isocyanate forming the polyurea crosslinked particles is an isocyanate compound having two or more isocyanate groups that can be dispersed as fine particles in water when it is added to water and stirred. Specifically, the self-emulsifying isocyanate is a compound formed such that a hydrophilic group (for example, a hydroxy group, an oxyalkylene group, and a carboxy group) is introduced into a polyisocyanate polymer that is formed of at least one of an aliphatic diisocyanate and an alicyclic diisocyanate and has any one structure of the group consisting of biuret, isocyanurate, urethane, uretdione, and allophanate in a molecule.

The self-emulsifying isocyanate is not particularly limited, and known self-emulsifying isocyanates can be used.

Specific examples of the self-emulsifying isocyanate include BURNOCK (registered trademark) DNW-5500, DNW-6000 (DIC Corporation), Basonat (registered trademark) HW1000, HW180PC, LR9056, LR9080 (BASF Corporation), TAKENATE (registered trademark) WD-720, WD-725, WD-730, WB-700, WB-820, WB-920 (Mitsui Chemicals, Inc.), DURANATE (registered trademark) WB40-100, WB40-80D, WT20-100, WT30-100, WE50-100 (Asahi Kasei Chemicals Corporation), Bayhydur (registered trademark) 3100, 304, 305, XP2451/1, XP2487/1, XP2547, XP2655, XP2700, DN, DA-L, 401-70 (Sumika Bayer Urethane Co., Ltd.) and the like.

One kind of the self-emulsifying isocyanate may be used alone or a combination of two or more kinds thereof may be used.

The non-self-emulsifying isocyanate having two or more isocyanate groups and having a ring structure is an isocyanate compound that does not disperse as fine particles in water even when it is added to water and stirred, and includes, for example, an alicyclic isocyanate and an aromatic isocyanate.

Examples of the alicyclic isocyanate include 1,4-cyclohexane diisocyanate, 4,4'-dicyclohexylmethane diisocyanate, isophorone diisocyanate, hydrogenated xylylene diisocyanate, norbornene diisocyanate, hydrogenated tolylene diisocyanate, and cyclo butane diisocyanate.

Examples of the aromatic isocyanate include isocyanate monomers such as tolylene-2,4-diisocyanate, tolylene 2,6-diisocyanate, diphenylmethane-4,4'-diisocyanate, 3-methyl diphenylmethane-4,4'-diisocyanate, m- or p-phenylene diisocyanate, chloro phenylene-2,4-diisocyanate, naphthalene 1,5-diisocyanate, diphenyl-4,4'-diisocyanate, 3,3'-dimethyl diphenyl-4,4'-diisocyanate, 1,3,5-triisopropylbenzene-2,4-diisocyanate, ca arbodiimide-modified diphenyl meta diisocyanate, a polyphenylpolymethylene isocyanate and diphenyl ether diisocyanate.

Further, the non-self-emulsifying isocyanate may be a modified polyisocyanate that is formed of an isocyanate monomer (the alicyclic isocyanate or the aromatic isocyanate).

For example, the modified polyisocyanate includes a polyisocyanate that is obtained by polymerizing isocyanate monomers and having an isocyanurate ring and a polyisocyanate that is obtained by reacting isocyanate monomers with water and having a biuret bond.

As a preferable self-emulsifying isocyanate forming the polyurea crosslinked particles of the present invention, DURANATE WB40-100 (Asahi Kasei Chemicals Corporation) is exemplified.

As the non-self-emulsifying isocyanate forming the polyurea crosslinked particles of the present invention and having a ring structure, isophorone diisocyanate is preferably exemplified.

The self-emulsifying isocyanate has a content ratio that is preferably 30 to 90 mass % and more preferably 40 to 60 mass % with respect to 100 mass % of a total of an isocyanate component included in the polyurea crosslinked particles. As long as the content ratio of the self-emulsifying isocyanate is the lower limit or more, it is possible to suppress generation of coarse particles in which an average particle size of the polyurea crosslinked particles is greater than a thickness of a coating film. When the content ratio of the self-emulsifying isocyanate is the upper limit or less, it is possible to prevent an average particle size of the polyurea crosslinked particles from being too small, and it is possible to suppress paint from thickening when the paint is formed.

Therefore, it is possible to decrease a surface roughness when the coating film is formed and oil retainability increases.

Either the self-emulsifying isocyanate or the non-self-emulsifying isocyanate preferably includes three or more isocyanate groups in order to obtain crosslinked particles. When isocyanates having three or more isocyanate groups are included, even if the isocyanates react with each other and form urea bonds, cross-linkable isocyanate groups remain. By reacting the remaining isocyanate groups with another isocyanate, it is possible to easily form crosslinked particles.

In addition, when isocyanates having three or more isocyanate groups are included, it is possible to further increase a crosslink density and increase heat resistance.

In addition, the polyurea crosslinked particles of the present invention may include isocyanate as a constituent component in addition to the self-emulsifying isocyanate having two or more isocyanate groups and the non-self-emulsifying isocyanate having two or more isocyanate groups and having a ring structure.

In addition, the polyurea crosslinked particles of the present invention do not use a polyol such as a polyether polyol as a constituent component. When the polyol is used, the particles become polyurethane polyurea composite crosslinked particles rather than polyurea crosslinked particles.

The polyurea crosslinked particles of the present invention have a crosslink density that is $1\times10^{-4}$ mol/g or more, and more preferably $5\times10^{-4}$ mol/g or more. When the crosslink density of the polyurea crosslinked particles is the lower limit or more, heat resistance of the polyurea crosslinked particles increases. When the crosslink density of the polyurea crosslinked particles is the lower limit or more, the polyurea crosslinked particles become insoluble in a solvent.

The term "crosslink density" refers to the number of moles of an isocyanate component having three or more isocyanate groups per unit mass of the polyurea crosslinked particles.

The polyurea crosslinked particles have a maximum particle size that is smaller than a film thickness of a binder resin. When the film thickness is set to 3 to 15 μm, the maximum particle size of the polyurea crosslinked particles is preferably less than 3 μm, more preferably less than 2.8 μm, and most preferably less than 2.5 μm. When the maximum particle size of the polyurea crosslinked particles is less than the upper limit, the polyurea crosslinked particles do not protrude from a surface of a coating film of the binder resin, and it is possible to easily form an oil film on a surface of a lubricant-retaining coating film.

The maximum particle size is a maximum particle size measured by a laser diffraction type particle size measurer (for example, SALD2100 commercially available from Shimadzu Corporation).

(Method of Preparing Polyurea Crosslinked Particles for a Transport Device Member)

The polyurea crosslinked particles for a transport device member of the present invention can be prepared by a preparing method including reacting the self-emulsifying isocyanate having two or more isocyanate groups and the non-self-emulsifying isocyanate having two or more isocyanate groups and having a ring structure in the presence of water. The polyurea crosslinked particles of the present invention can be prepared by, for example, suspension polymerization in water using the self-emulsifying isocyanate having two or more isocyanate groups and the non-self-emulsifying isocyanate having two or more isocyanate groups and having a ring structure.

The suspension polymerization in water can be performed such that the self-emulsifying isocyanate having two or more isocyanate groups and the non-self-emulsifying isocyanate having two or more isocyanate groups and having a ring structure are added and suspension-polymerized in water. The suspension polymerization can be performed by, for example, reacting at 30 to 70° C. for 2 to 10 hours.

According to the preparing method of the polyurea crosslinked particles, it is possible to easily prepare the polyurea crosslinked particles whose maximum particle size is less than the upper limit.

As the polyurea crosslinked particles described above, for example, polyurea crosslinked particles including the self-emulsifying isocyanate (specifically, DURANATE WB40-100 commercially available from Asahi Kasei Chemicals Corporation) whose percentage is 50 mass % and the non-self-emulsifying isocyanate (isophorone diisocyanate) whose percentage is 50 mass % with respect to 100 mass % of a total of the isocyanate component included in the polyurea crosslinked particles, and having a maximum particle size of 2.4 μm and a crosslink density of $6.7\times10^{-4}$ mol/g are exemplified.

As described above, the polyurea crosslinked particles of the present invention are crosslinked at the above crosslink density and prepared using the self-emulsifying isocyanate having two or more isocyanate groups and the non-self-emulsifying isocyanate having two or more isocyanate groups and having a ring structure. Since the polyurea crosslinked particles have no chemical structure that easily reacts with an acid, acid resistance is high.

The polyurea crosslinked particles of the present invention are appropriately used for a member of a transport device such as a motor vehicle, for example, a sliding member forming a piston, a slide bearing, or a gear of an engine. In addition, the polyurea crosslinked particles of the present invention can be used for an instrument panel or a decorative molded product of a dashboard of the motor vehicle.

<Sliding Member>

In the sliding member of the present invention, a lubricant-retaining coating film is formed on a surface of a sliding portion. In the sliding member, a portion in which the lubricant-retaining coating film is formed has a material that is made of any of a metal, a ceramic, and a resin. The metal is preferable. As a type of the metal, an aluminum alloy is more preferable. When the aluminum alloy is used, high toughness and reduced weight are obtained, and heat resistance and wear resistance increase.

In addition, the sliding member has a shape that is not particularly limited. For example, a flat plate shape, a cylindrical shape, and a columnar shape may be used.

The sliding member is used for, for example, a piston, a slide bearing, and a gear of an engine.

The lubricant-retaining coating film is a coating film including a plurality of polyurea crosslinked particles of the present invention and a binder resin for binding the polyurea crosslinked particles to each other.

In view of a film thickness of the lubricant-retaining coating film, a thin film having a film thickness of a range at which frictional resistance in the sliding portion can be sufficiently reduced is preferable. Specifically, the film thickness is preferably 3 to 15 μm.

The film thickness of the lubricant-retaining coating film can be obtained such that thicknesses before and after coating of the lubricant-retaining coating film are measured using a micro gauge and a difference thereof is obtained.

As the binder resin included in the lubricant-retaining coating film, a high heat-resistant resin having a glass transition temperature (that can be measured by, for example, differential thermal analysis) of 250° C. or more and a high heat resistance is used. Examples of the resin having a high heat resistance include a polyamide-imide resin, a polyimide resin, an epoxy resin, and a polyimide resin vendor oxazole. In consideration of a higher heat resistance, the polyamide-imide resin is preferable.

In addition, in general, a thermosetting resin in which a thermosetting monomer or oligomer is thermally cured is used as the binder resin.

The polyurea crosslinked particles in the lubricant-retaining coating film have a content ratio that is preferably 60 mass % or less and more preferably 5 to 30 mass % when the lubricant-retaining coating film is set as 100 mass %. As long as the content ratio of the polyurea crosslinked particles in the lubricant-retaining coating film is the lower limit or more, it is possible to sufficiently ensure oil retainability. As long as the content ratio of the polyurea crosslinked particles in the lubricant-retaining coating film is the upper limit or less, it is possible to prevent a protrusion height of the polyurea crosslinked particles from a surface of the coating film made of the binder resin from excessively increasing, and it is possible to easily form the oil film on a surface of the lubricant-retaining coating film.

Since the polyurea crosslinked particles included in the lubricant-retaining coating film are resin particles having a high affinity with an oil, an oil adsorption property is obtained. In particular, polyurea on surfaces of the particles has a high oil adsorption property.

In addition, since the polyurea crosslinked particles of the present invention include the self-emulsifying isocyanate and the polyurea crosslinked particles prepared using the self-emulsifying isocyanate tend to have a smaller particle size, the lubricant-retaining coating film including the polyurea crosslinked particles of the present invention has a small difference in height of a surface unevenness. Therefore, when an oil film is formed on a surface of another member, an area in contact with the oil film becomes larger.

Therefore, in the lubricant-retaining coating film in the sliding member of the present invention, in the presence of a lubricant, it is possible to firmly retain the oil film that contributes to improve a sliding property with respect to another member, and it is possible to suppress the oil film from being scraped off due to sliding of the other member. As a result, it is possible to prevent the oil film from being separated. Accordingly, since a lowest shear layer can be set in the oil film, it is possible to decrease frictional resistance and sliding torque sufficiently and sustainably. Moreover, flash heat generation during sliding can be suppressed by decreasing the frictional resistance. Therefore, it is possible to suppress thermal degradation of the binder resin included in the lubricant-retaining coating film.

In addition, since the polyurea crosslinked particles included in the lubricant-retaining coating film have high acid resistance, decomposition is less likely to occur even when the lubricant is degraded and a degree of acidity thereof increases. Accordingly, even when the lubricant-retaining coating film including the polyurea crosslinked particles of the present invention is used for a long time, oil retainability is less likely to decrease and it is difficult to cause a decrease in the sliding property.

The sliding member in which the lubricant-retaining coating film is formed on a surface of the sliding portion is prepared by, for example, the following preparing method.

First, the polyurea crosslinked particles of the present invention and a binder resin are dispersed in a solvent to prepare a dispersion solution. The solvent is not particularly limited. N-methylpyrrolidone, a ketone solvent, and xylene are appropriately used, and N-methylpyrrolidone is preferable.

Next, the prepared dispersion solution is applied to a sliding surface of the sliding member. A method of applying the dispersion solution is not particularly limited. For example, an air spray, an airless spray, electrostatic coating, pad printing, or screen printing can be applied.

Next, the coating film of the dispersion solution is dried by a general method to evaporate the solvent and is then heated at a predetermined temperature (for example, 230° C.) to cure the coating film. Therefore, the sliding member in which the lubricant-retaining coating film is formed on the surface is prepared.

In the lubricant-retaining coating film in the sliding member of the present invention, since a resin having a glass transition temperature of 250° C. or more is used as the binder resin, a high heat resistance is obtained. Therefore, even when the sliding member is used under a high temperature environment, oil retainability is excellent, a lubricant can be sufficiently retained, and a high sliding property can be maintained. Accordingly, the sliding member can be appropriately used as a sliding member of an internal combustion engine (for example, an engine) that requires a high heat resistance.

For example, the sliding member can be used as a piston of the internal combustion engine. As shown in FIG. 1A, in general, a piston 1 of an internal combustion engine is accommodated inside a cylinder 4. A lubricant 7 is provided to an inner surface of the cylinder 4. When the sliding member in which a lubricant-retaining coating film 3 is formed on a surface of a sliding member main body 2 is used as the piston 1, the lubricant 7 can be retained on the lubricant-retaining coating film 3 of a surface of the piston 1. Therefore, an oil film 10 of the lubricant can be formed between the piston 1 and the cylinder 4. Accordingly, since a lowest shear layer can be set in the oil film 10, it is possible to decrease frictional resistance and sliding torque sufficiently and sustainably.

When a solid lubrication film is formed as described in PCT International Publication No. WO 2008/044598, as shown in FIG. 1B, the lubricant 7 is unable to be retained on a surface of a piston 9, and it is unable to form the oil film that can contribute to improve a sliding property. Accordingly, the lowest shear layer serves as an interface between a solid lubrication film 6 and the cylinder 4, and it is difficult to decrease frictional resistance and sliding torque sufficiently and sustainably.

Note that the sliding member is not limited to the above aspect, and various omissions, substitutions, and changes can be made without departing from the spirit and scope of the present invention.

EXAMPLES

Hereinafter, the present invention will be described in further detail based on specific examples, although the present invention is not limited to the following examples.

Example 1

A dispersion solution including a binder resin containing a polyamide-imide resin, the following particles 1, and N-methylpyrrolidone was prepared. A content ratio of the particles with respect to a total mass of the binder resin and the particles is shown in Table 2.

Next, the prepared dispersion solution was applied to a plate-shaped aluminum alloy according to spray coating conditions shown in Table 1, drying was performed to evaporate a solvent, and then heating was performed to cure the binder resin. A sliding member having a surface on which a lubricant-retaining coating film was formed was thus obtained. In addition, in Example 1, the lubricant-retaining coating film was subjected to immersion contact with an acid of a pH of 1 at a contact temperature of 80° C. for a contact time of 100 hours.

TABLE 1

| Items | | Spray coating |
|---|---|---|
| Spray/shot device | | HP-C commercially available from ANEST IWATA Corporation |
| Pre-treatment | Washing solution | Ketone |
| | Washing time | 1 minute |
| | Preheating | 35° C. |
| Spray/shot treatment | Pressure | 0.1 Mpa |
| | Nozzle distance | 50 mm |
| | Nozzle diameter | φ 0.3 mm |
| | Time/number of times | Twice |
| Post-treatment | Calcination temperature | 230° C. |
| | Calcination time | 60 minutes |
| | Target surface roughness | Rz: 1.5 μm or less |
| | Target film thickness | 5 μm |

Examples 2 to 6 and Comparative Examples 1 to 6

Sliding members having a surface on which a lubricant-retaining coating film was formed were obtained in the same manner as in Example 1 except that one or both of a type of particles and a content ratio of the particles with respect to a total mass of a binder resin and the particles were changed as shown in Table 2. In Examples 2 to 6 and Comparative Example 3, the lubricant-retaining coating film was in contact with an acid in the same manner as in Example 1, and the lubricant-retaining coating film was not in contact with an acid in Comparative Examples 1, 2, and 4 to 6.

Comparative Example 7

A plate-shaped aluminum alloy on which no lubricant-retaining coating film was formed was prepared as a sliding member. In addition, a surface was not in contact with an acid.

[Particles]

Particles 1: a self-emulsifying isocyanate (DURANATE (registered trademark) WB40-100 commercially available from Asahi Kasei Chemicals Corporation) at 50 mass % and a non-self-emulsifying isocyanate (isophorone diisocyanate) at 50 mass % were suspension-polymerized in water to prepare polyurea crosslinked particles (maximum particle size: 2.4 μm, crosslink density: $6.7 \times 10^{-4}$ mol/g).

Particles 2: "Art Pearl (registered trademark) NI-800T" commercially available from Negami Chemical Industrial Co., Ltd (polyurethane polyurea crosslinked particles, crosslink density: $1.24 \times 10^{-3}$ mol/g)

Particles 3: a self-emulsifying isocyanate (DURANATE (registered trademark) WB40-100 commercially available from Asahi Kasei Chemicals Corporation) at 70 mass % and an isocyanate-terminated prepolymer (polyol component: a polyether polyol having a ring structure and a spiro glycol both terminals of which were modified with HDI) at 30 mass % were suspension-polymerized in water to prepare polyurethane polyurea composite crosslinked particles (maximum particle size: 2.9 μm, crosslink density: $9.06 \times 10^{-4}$ mol/g).

TABLE 2

| | | Type of particles | Content ratio of particles (mass %) | Acid contact | Tangential force reduction rate (%) |
|---|---|---|---|---|---|
| Examples | 1 | Particles 1 | 5 | Yes | 64 |
| | 2 | | 10 | Yes | 69 |
| | 3 | | 15 | Yes | 72 |
| | 4 | | 20 | Yes | 70 |
| | 5 | | 40 | Yes | 62 |
| | 6 | | 60 | Yes | 60 |
| Comparative Examples | 1 | Particles 2 | 15 | No | 25 |
| | 2 | Particles 3 | 15 | No | 76 |
| | 3 | | 15 | Yes | 35 |
| | 4 | | 40 | No | 33 |
| | 5 | | 60 | No | 30 |
| | 6 | | 80 | No | 30 |
| | 7 | None | — | No | 0 |

<Evaluation of the Lubricant-Retaining Coating Films Formed on the Surfaces of the Sliding Members Obtained in the Examples>

(Heat Resistance)

Heat resistance was evaluated using a mass reduction rate when the particles (particles 1 to 3) used in the examples were heated. FIG. 2 shows the mass reduction rate when particles 1 to 3 were heated. The mass reduction rate (%) was obtained using the formula [{(particle mass before heating)−(particle mass after heating)}/(particle mass before heating)]×100.

As shown in FIG. 2, particles 1 serving as the polyurea crosslinked particles of the present invention had a lower mass reduction rate when heated than particles 2 and particles 3 serving as the polyurethane polyurea composite crosslinked particles. Specifically, particles 1 serving as the polyurea crosslinked particles of the present invention showed a high heat resistance with substantially no mass reduction amount during heating at 200° C. or less. Particles 2 and particles 3 serving as the polyurethane polyurea composite crosslinked particles had a higher mass reduction rate and a lower heat resistance than particles 1 serving as the polyurea crosslinked particles of the present invention.

(Surface Shape)

Figure 4:
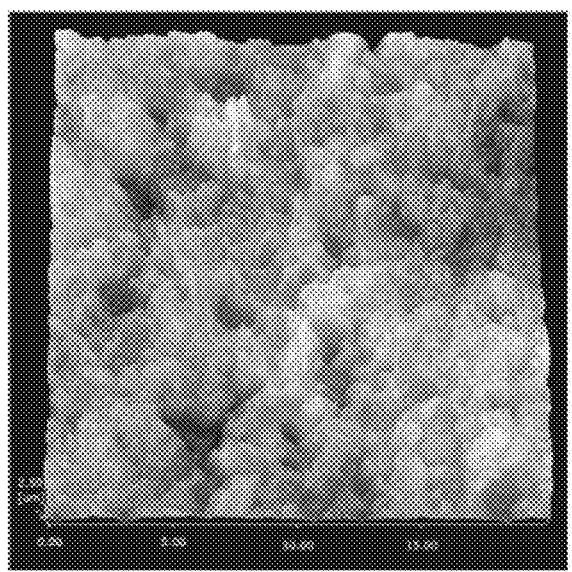
FIG. 4 shows an image of a shape of a surface of a lubricant-retaining coating film of a sliding member of Comparative Example 3, which is observed using a scanning probe microscope.

Shapes of surfaces of the lubricant-retaining coating films of the sliding members obtained in Example 3 and Comparative Example 3 were measured using a scanning probe microscope. FIG. 3 and FIG. 4 show images of shapes of the surfaces of the lubricant-retaining coating films of the sliding members of Example 3 and Comparative Example 3, respectively.

Figure 5A:
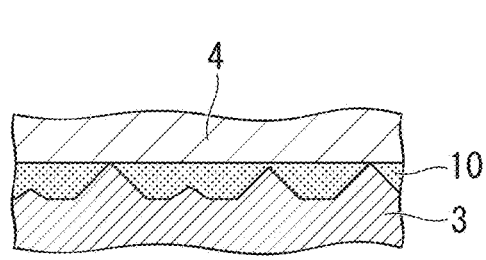
FIG. 5A is a cross-sectional view schematically showing a lubricant-retaining coating film having a small difference in height of unevenness.
Figure 5B:
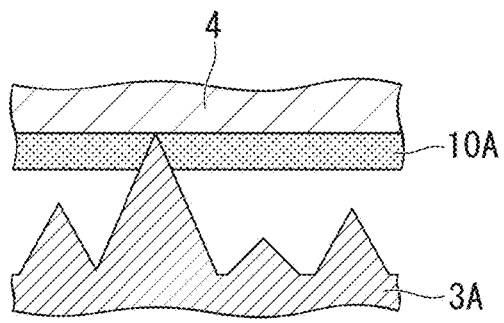
FIG. 5B is a cross-sectional view schematically showing a lubricant-retaining coating film having a large difference in height of unevenness.

In addition, the shape of the surface of the lubricant-retaining coating film affected oil retainability. That is, as shown in FIG. 5A, in the lubricant-retaining coating film 3 having a small difference in height of unevenness, an area in contact with the oil film 10 formed on a surface of another member 4 became larger, and the oil film 10 could be retained sufficiently and sustainably. On the other hand, as shown in FIG. 5B, in the lubricant-retaining coating film 3A having a large difference in height of unevenness, an area in contact with an oil film 10A formed on a surface of another member 4 became smaller, and it was difficult to retain the oil film 10A sufficiently and sustainably.

(Oil Adsorption Force)

Figure 6:
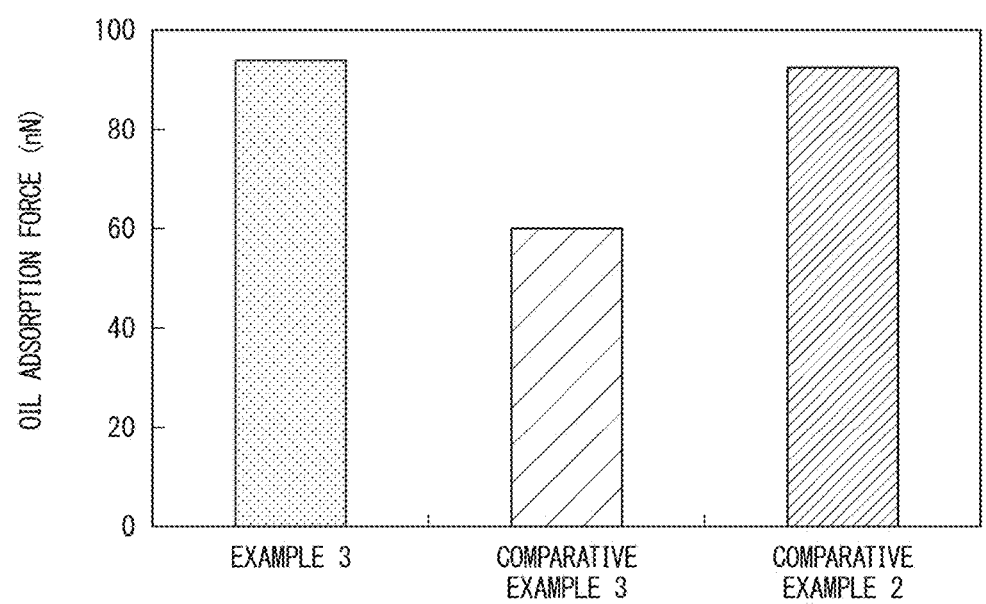
FIG. 6 is a graph showing oil adsorption forces of lubricant-retaining coating films of sliding members of Example 3 and Comparative Examples 2 and 3.

The oil adsorption force is an oil adsorption force per unit area of a lubricant-retaining coating film that was measured such that a partial oil adsorption force was measured according to the following measurement conditions using a scanning probe microscope (hereinafter referred to as "SPM") including a cantilever, and a specific surface area of each coating film was multiplied by an oil adsorption force measurement value. FIG. 6 shows oil adsorption forces (nN) of the lubricant-retaining coating films of the sliding members of Example 3 and Comparative Examples 2 and 3.

Figure 7A:
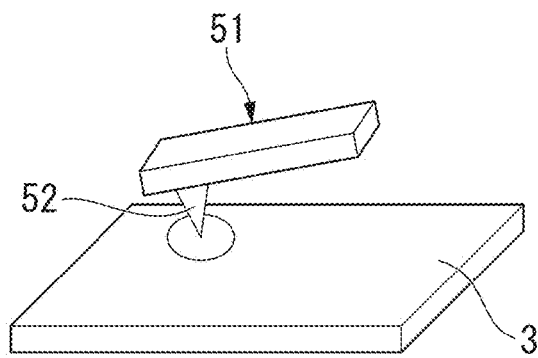
FIG. 7A is a diagram showing a scanning probe microscope for measuring an oil adsorption force, and is a perspective view of an entire scanning probe microscope.
Figure 7B:
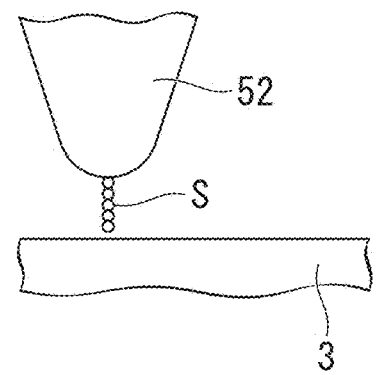
FIG. 7B is a diagram showing a scanning probe microscope for measuring an oil adsorption force, and is a diagram showing an enlarged distal end portion of a cantilever included in the scanning probe microscope.

Specifically, in the measurement of the oil adsorption force by the SPM, as shown in FIG. 7A, a surface of the lubricant-retaining coating film 3 was scanned using a cantilever 51 (refer to FIG. 7B) to which a modified hydrocarbon S similar to the lubricant was applied. Therefore, an adsorption degree between the lubricant-retaining coating film 3 and a distal end portion 52 of the cantilever 51 to which the modified hydrocarbon S was applied was measured, and therefore the oil adsorption force of the lubricant-retaining coating film 3 was measured. That is, a force necessary for separating the lubricant-retaining coating film 3 in contact with the distal end portion 52 of the cantilever 51 to which the modified hydrocarbon S was applied from the distal end portion 52 was measured to measure the oil adsorption force of the lubricant-retaining coating film 3.

As shown in FIG. 6, the lubricant-retaining coating film of the sliding member of Example 3 had a higher oil adsorption force than the lubricant-retaining coating film of the sliding member of Comparative Example 3. Note that, in Example 3 and Comparative Example 3, the lubricant-retaining coating film was in contact with an acid.

[Measurement Conditions of an Oil Adsorption Force]
Measurement device: "JSPM9600" commercially available from Shimadzu Corporation
Measurement mode: force curve mode
Measurement range: 20 μm square
Measurement point: 32 points×32 points (Dispersibility of Polyurea Crosslinked Particles)

In the lubricant-retaining coating films of the sliding members of Example 3 and Comparative Examples 1 and 3, a distribution of urethane and urea on the surface of the lubricant-retaining coating films was examined by time-of-flight secondary ion mass spectrometry.

Figure 8:
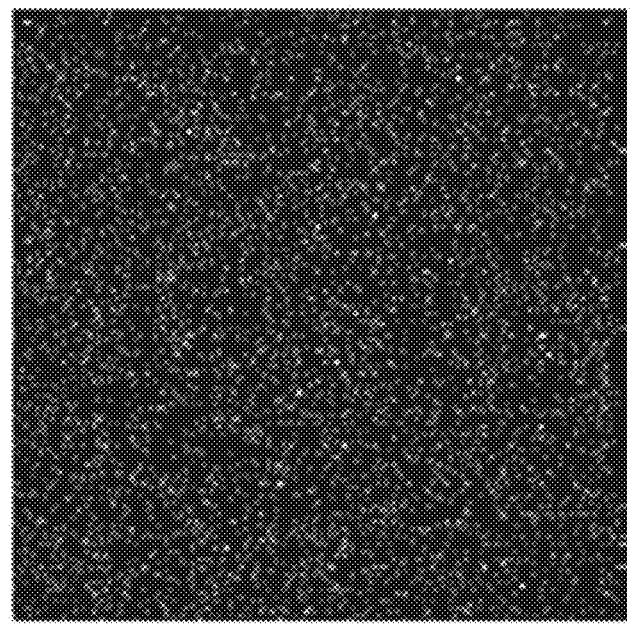
FIG. 8 is an image that is obtained by time-of-flight secondary ion mass spectrometry and shows a surface analysis result of the lubricant-retaining coating film of the sliding member of Example 3.
Figure 9:
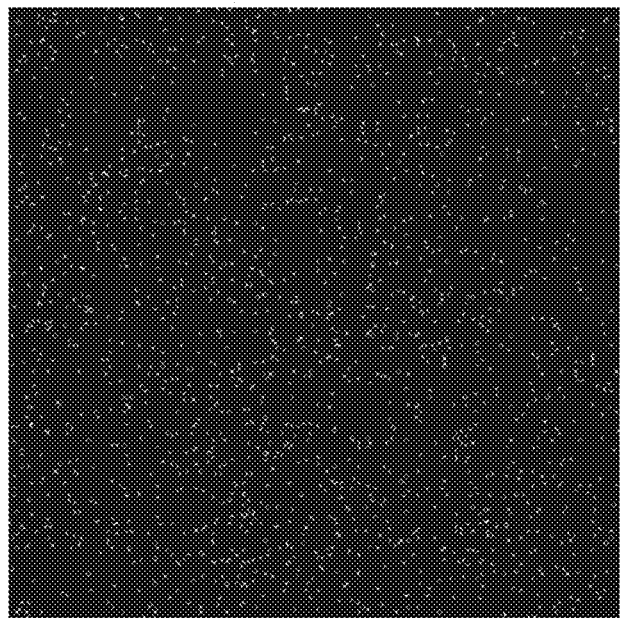
FIG. 9 is an image that is obtained by time-of-flight secondary ion mass spectrometry and shows a surface analysis result of a lubricant-retaining coating film of a sliding member of Comparative Example 1.
Figure 10:
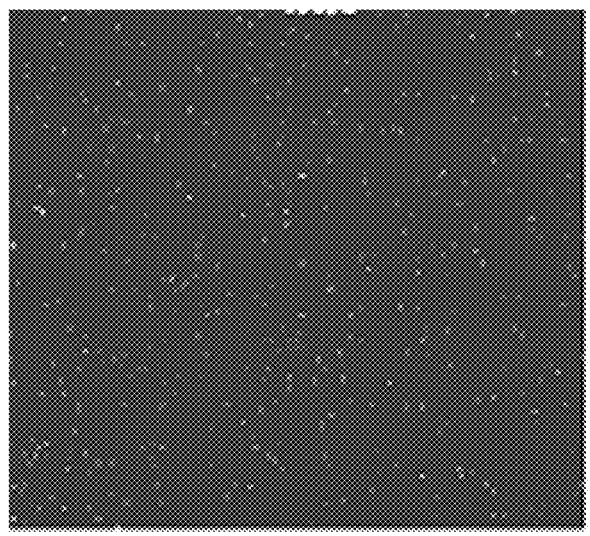
FIG. 10 is an image that is obtained by time-of-flight secondary ion mass spectrometry and shows a surface analysis result of the lubricant-retaining coating film of the sliding member of Comparative Example 3.

FIG. 8, FIG. 9 and FIG. 10 show surface analysis results of the lubricant-retaining coating films of the sliding members of Example 3, Comparative Example 2 and Comparative Example 3, respectively. In FIG. 8, white parts indicate parts in which a large amount of urea is included. In FIGS. 9 and 10, white parts indicate parts in which a large amount of urethane and urea is included.

The lubricant-retaining coating film of the sliding member of Example 3 was in contact with an acid. However, as shown in FIG. 8, many white parts indicating urea were observed and uniformly distributed without a large deviation.

The lubricant-retaining coating film of the sliding member of Comparative Example 2 was not in contact with an acid. Therefore, as shown in FIG. 9, many white parts indicating urethane and urea were uniformly observed. In the lubricant-retaining coating film of the sliding member of Comparative Example 3 that was in contact with an acid, as shown in FIG. 10, white parts indicating urethane and urea decreased.

Since a urea component retaining an oil is, in general, more uniformly included in the lubricant-retaining coating film of the sliding member of Example 3 than the lubricant-retaining coating film of the sliding member of Comparative Example 3, it should be understand that oil retainability was excellent.

(Coefficient of Friction)

Figure 11:
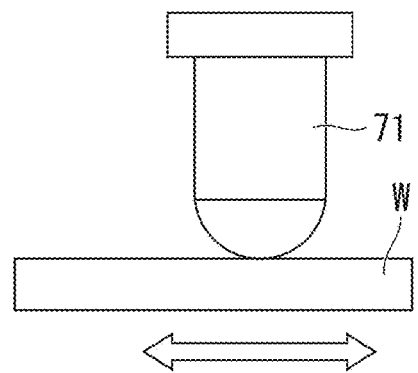
FIG. 11 is a side view schematically showing an oscillation test for measuring a coefficient of friction.

Using the dispersion solutions prepared in Example 3 and Comparative Examples 1 to 3, the lubricant-retaining coating film was formed on a surface of a test panel made of aluminum, and an engine oil (an oil for gasoline engines, viscosity grade: 0W20) was diluted (10-fold dilution) at room temperature and then 10 μL was coated on the surface. Next, as shown in FIG. 11, a ball 71 having a dome-shaped distal end was brought into contact with a surface of a lubricant-retaining coating film W and was repeatedly linearly reciprocated to measure the coefficient of friction. Measurement conditions in this case are shown in Table 3.

Figure 12:
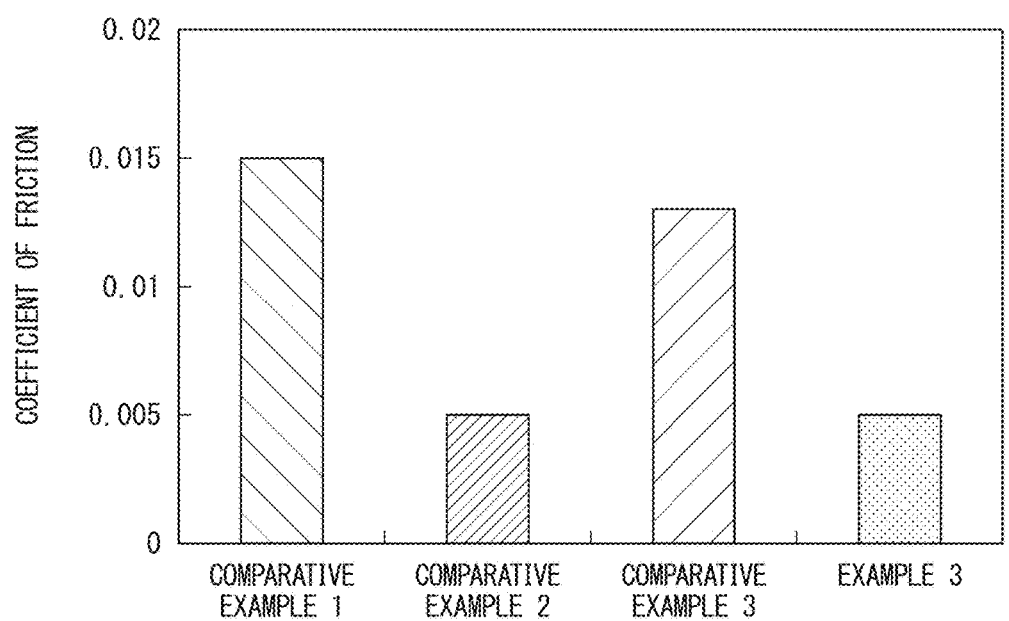
FIG. 12 is a graph showing coefficients of friction of lubricant-retaining coating films using dispersion solutions prepared in Example 3 and Comparative Examples 1 to 3.

FIG. 12 shows measurement results of the coefficient of friction. As shown in FIG. 12, the lubricant-retaining coating film using the dispersion solution prepared in Example 3 had a smaller coefficient of friction than the lubricant-retaining coating film using the dispersion solutions prepared in Comparative Examples 1 and 3. The lubricant-retaining coating film using the dispersion solution prepared in Comparative Example 2 had a similar coefficient of friction to that of the lubricant-retaining coating film using the dispersion solution prepared in Example 3. However, the lubricant-retaining coating film prepared in Comparative Example 2 was a coating film that was not in contact with an acid.

Based on these results, it was confirmed that the coefficient of friction of the lubricant-retaining coating film including the polyurea crosslinked particles of the present invention was sufficiently small.

TABLE 3

| | |
|---|---|
| Ball | φ 6.3 mm SUJ2 |
| Test panel | Aluminum substrate |
| Load | 4N |
| Surface pressure (approximate value) | 10 Mpa |
| Reciprocating width | 10 mm |
| Rate | 4 Hz |
| Heating temperature | Room temperature |
| Atmosphere | Engine oil (0W20) |

(Tangential Force Reduction Rate)

Figure 13:
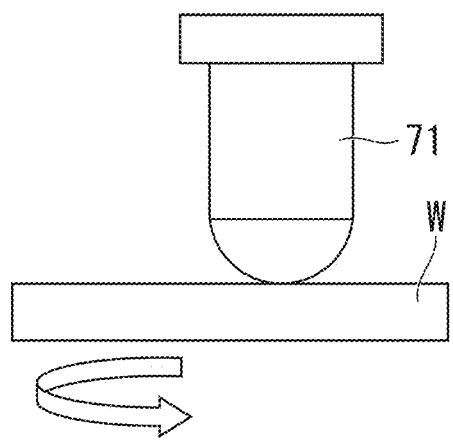
FIG. 13 is a side view schematically showing a rotation test for measuring a tangential force.

Using the dispersion solutions prepared in the examples, the lubricant-retaining coating film was formed on a surface of a test panel made of stainless steel (SUS), and an engine oil (an oil for gasoline engines, viscosity grade: 0W20) was diluted (10-fold dilution) at room temperature and then 10 μL was coated on the surface. Next, as shown in FIG. 13, the ball 71 having a dome-shaped distal end was brought into contact with the surface of the lubricant-retaining coating film W and was repeatedly circumferentially moved to measure a force in a tangential direction, that is, a tangential force A. Measurement conditions are shown in Table 4.

Next, a tangential force reduction rate with respect to a tangential force B of a solid lubrication film including molybdenum disulfide was obtained using the formula $\{(B-A)/B\}\times 100$. The results are shown in Table 2. A higher value of the tangential force reduction rate indicates a better sliding property.

As shown in Table 2, it was confirmed that the lubricant-retaining coating films formed using the dispersion solutions prepared in Examples 1 to 6 using the polyurea crosslinked particles of the present invention had a high tangential force reduction rate despite coming into contact with an acid, and the frictional resistance could be reduced. On the other hand, the lubricant-retaining coating films formed using the dispersion solutions prepared in Comparative Example 1 and Comparative Examples 4 to 7 had a low tangential force reduction rate despite not coming into contact with an acid. In addition, the lubricant-retaining coating film formed using the dispersion solution prepared in Comparative Example 2, which was not brought into contact with an acid, showed a high tangential force reduction rate. However, the lubricant-retaining coating film formed using the dispersion solution prepared in Comparative Example 3, which was brought into contact with an acid, had a low tangential force reduction rate and showed insufficient frictional resistance reduction.

TABLE 4

| | |
|---|---|
| Ball | φ 6.3 mm SUJ2 |
| Test panel | Aluminum substrate |
| Load | 4N |
| Surface pressure (approximate value) | 10 Mpa |
| Rate | 2.8 m/s |
| Heating temperature | Room temperature |
| Atmosphere | Engine oil (0W20) |

REFERENCE SIGNS LIST 1, 9 Piston (sliding member)
2 Sliding member main body
3, 3A, W Lubricant-retaining coating film
4 Cylinder (another member)
51 Cantilever
52 Distal end portion of cantilever
6 Solid lubrication film
7 Lubricant
71 Ball
10, 10A Oil film
S Modified hydrocarbon

What is claimed is:

1. Polyurea crosslinked particles for a transport device member that are particles formed of reactants of a self-emulsifying isocyanate having two or more isocyanate groups and a non-self-emulsifying isocyanate having two or more isocyanate groups and having a ring structure in the presence of water, and the particles having no urethane structure,
wherein a crosslink density is $1 \times 10^{-4}$ mol/g or more.

2. The polyurea crosslinked particles for a transport device member according to claim 1, wherein any of the self-emulsifying isocyanate and the non-self-emulsifying isocyanate includes three or more isocyanate groups.

3. The polyurea crosslinked particles for a transport device member according to claim 1, wherein the self-emulsifying isocyanate has a content ratio that is 30 to 90 mass % when a total of the isocyanates is set as 100 mass %.

4. The polyurea crosslinked particles for a transport device member according to claim 2, wherein the self-emulsifying isocyanate has a content ratio that is 30 to 90 mass % when a total of the isocyanates is set as 100 mass %.

5. A sliding member in which a lubricant retaining coating film is formed on a surface of a sliding portion, and the lubricant retaining coating film includes a plurality of the polyurea crosslinked particles for a transport device member according to claim 1 and a binder resin for binding the polyurea crosslinked particles to each other.

6. The sliding member according to claim 5,
wherein the polyurea crosslinked particles in the lubricant-retaining coating film have a content ratio that is 60 mass % or less when the lubricant-retaining coating film is set as 100 mass %.

7. The sliding member according to claim 6,
wherein the polyurea crosslinked particles in the lubricant-retaining coating film have a content ratio that is 5 to 30 mass % when the lubricant-retaining coating film is set as 100 mass %.

8. A method of preparing polyurea crosslinked particles for a transport device member according to claim 1, comprising:
reacting a self-emulsifying isocyanate having two or more isocyanate groups and a non-self-emulsifying isocyanate having two or more isocyanate groups and having a ring structure in the presence of water so that the particles have a crosslink density of $1 \times 10^{-4}$ mol/g or more and the particles having no urethane structure.

* * * * *